United States Patent
Noyes

(10) Patent No.: US 7,234,903 B2
(45) Date of Patent: Jun. 26, 2007

(54) SNOWMOBILE LOCKING DEVICE

(76) Inventor: Scott L. Noyes, P.O. Box 1313, Belchertown, MA (US) 01007

( * ) Notice: Subject to any disclaimer, the term of this patent is extended or adjusted under 35 U.S.C. 154(b) by 26 days.

(21) Appl. No.: 11/120,758

(22) Filed: May 3, 2005

(65) Prior Publication Data
US 2005/0249566 A1 Nov. 10, 2005

Related U.S. Application Data

(60) Provisional application No. 60/568,749, filed on May 6, 2004.

(51) Int. Cl.
B61D 3/18 (2006.01)
(52) U.S. Cl. .......................................... 410/2
(58) Field of Classification Search .................... 410/2, 410/3, 31, 43, 96, 101, 102, 156
See application file for complete search history.

(56) References Cited

U.S. PATENT DOCUMENTS

| | | |
|---|---|---|
| 5,203,655 A | 4/1993 | Persau |
| 5,599,002 A | 2/1997 | Knutson |
| 5,622,299 A | 4/1997 | Berard |
| 5,716,175 A | 2/1998 | Fenske et al. |
| 5,785,471 A | 7/1998 | Godbersen |
| 5,816,757 A | 10/1998 | Huston |
| 5,902,081 A | 5/1999 | Zizzi |
| 6,086,298 A * | 7/2000 | Fanuele et al. ................. 410/3 |
| 6,099,218 A * | 8/2000 | Ferrari ........................... 410/3 |
| 6,112,560 A | 9/2000 | Mabee |
| 6,139,230 A | 10/2000 | Zizzi |
| 6,164,882 A | 12/2000 | Selle |
| 6,244,800 B1 | 6/2001 | Studanski |

* cited by examiner

Primary Examiner—H Gutman
(74) Attorney, Agent, or Firm—McCormick, Paulding & Huber LLP

(57) ABSTRACT

A locking device for use with a snowmobile trailer and tie down bar wherein the tie down bar is removably attached to the trailer via a tie down screw for securing a snowmobile to the trailer. The locking mechanism having a housing including a center portion and at least one flange portion. The housing defining an opening in a bottom side thereof for receiving a portion of the tie down bar and the tie down screw, the housing being positionable over the tie down bar and tie down screw for preventing access to the tie down screw. The housing further defining at least one lock opening for receiving the shackle of a lock for securing the housing to the tie down bar.

13 Claims, 4 Drawing Sheets

SNOWMOBILE LOCKING DEVICE

CROSS REFERENCE TO RELATED APPLICATIONS

This application claims the benefit of U.S. Provisional Application Ser. No. 60/568,749, filed on May 6, 2004.

FIELD OF THE INVENTION

The present invention relates to a locking device. More particularly, the present invention relates to a snowmobile locking device for securing a snowmobile to a trailer having a tie down bar.

BACKGROUND OF THE INVENTION

Snowmobiles are small, open vehicles used to transport one or two people on snow covered surfaces. Typically, snowmobiles are transported to and from locations where they are to be used in wheeled trailers. The trailers generally have a square or rectangular frame with a flat deck, usually wood, of a size to support one or more snowmobiles. Additionally, the deck of the trailer may tilt or ramps may be provided for driving a snowmobile onto the trailer.

The snowmobiles are often secured to the trailer deck using metallic hold-down or tie down bars that are removably attached to the deck of the trailer. Typically, the tie-down bars are disposed across the front and/or rear skis of a snowmobile. A threaded tensioning bolt or tie down screw, or the like, is utilized to tighten the bar against the skis securing the snowmobile to the trailer deck. It is possible, however, to cut the tensioning bolt with a hack saw or otherwise attack the tensioning bolt to breach the system and steal the snowmobile from-the trailer.

In light of the above, a need exists for a locking mechanism that can better secure a snowmobile to a trailer having a tie down bar for preventing unauthorized use or theft of the snowmobile. The present invention locking mechanism fulfills this need and more.

SUMMARY OF THE INVENTION

The present invention provides a locking mechanism for use with a snowmobile trailer having a tie down bar wherein the tie down bar is removably attached to the trailer via a tie down screw for securing a snowmobile to the trailer. The locking mechanism including a housing defining an opening in a bottom side thereof for receiving a portion of the tie down bar and the tie down screw such that the housing is positionable over the tie down screw and the tie down bar for preventing access to the tie down screw.

A lock opening is provided in the housing for receiving the shackle of a lock, the lock opening being disposed in a lower portion of the housing such that a shackle secured through the lock opening is below the tie down bar when the housing is positioned over the tie down bar, thereby securing the housing to the tie down bar and preventing access to the tie down screw.

Accordingly, it is an object of the present invention to provide a locking mechanism for securing a snowmobile to a trailer having an associated tie down bar.

It is an additional object of the present invention to provide a locking mechanism that isolates and protects the tensioning or tie down screw and allows the tie down bar to be secured with a padlock or similar lock.

DETAILED DESCRIPTION OF THE PREFERRED EMBODIMENT

Figure 1:
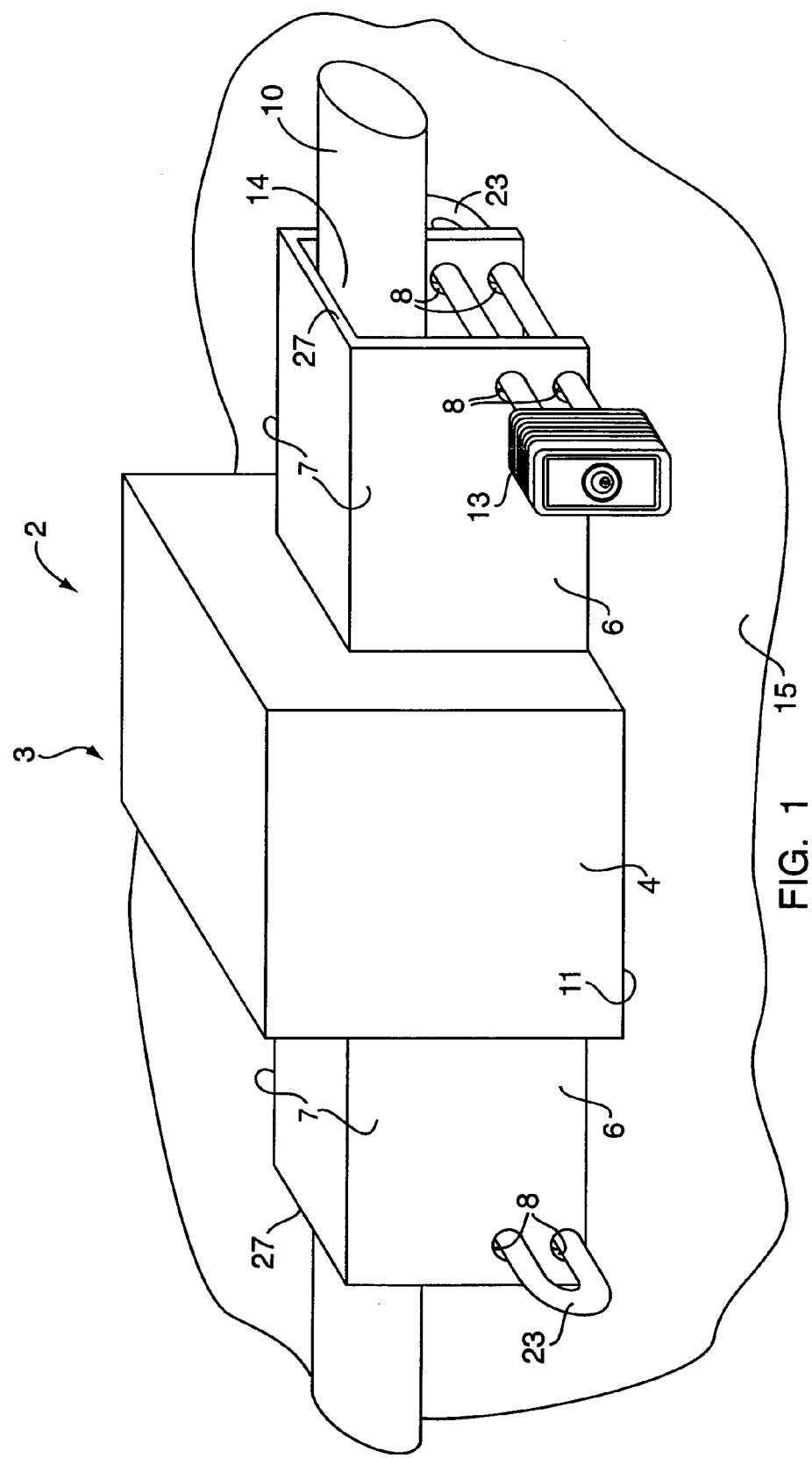
FIG. 1 is a perspective view of one embodiment of a locking mechanism according to the present invention shown secured to a typical tie-down bar used to secure a snowmobile to a trailer.
Figure 2:
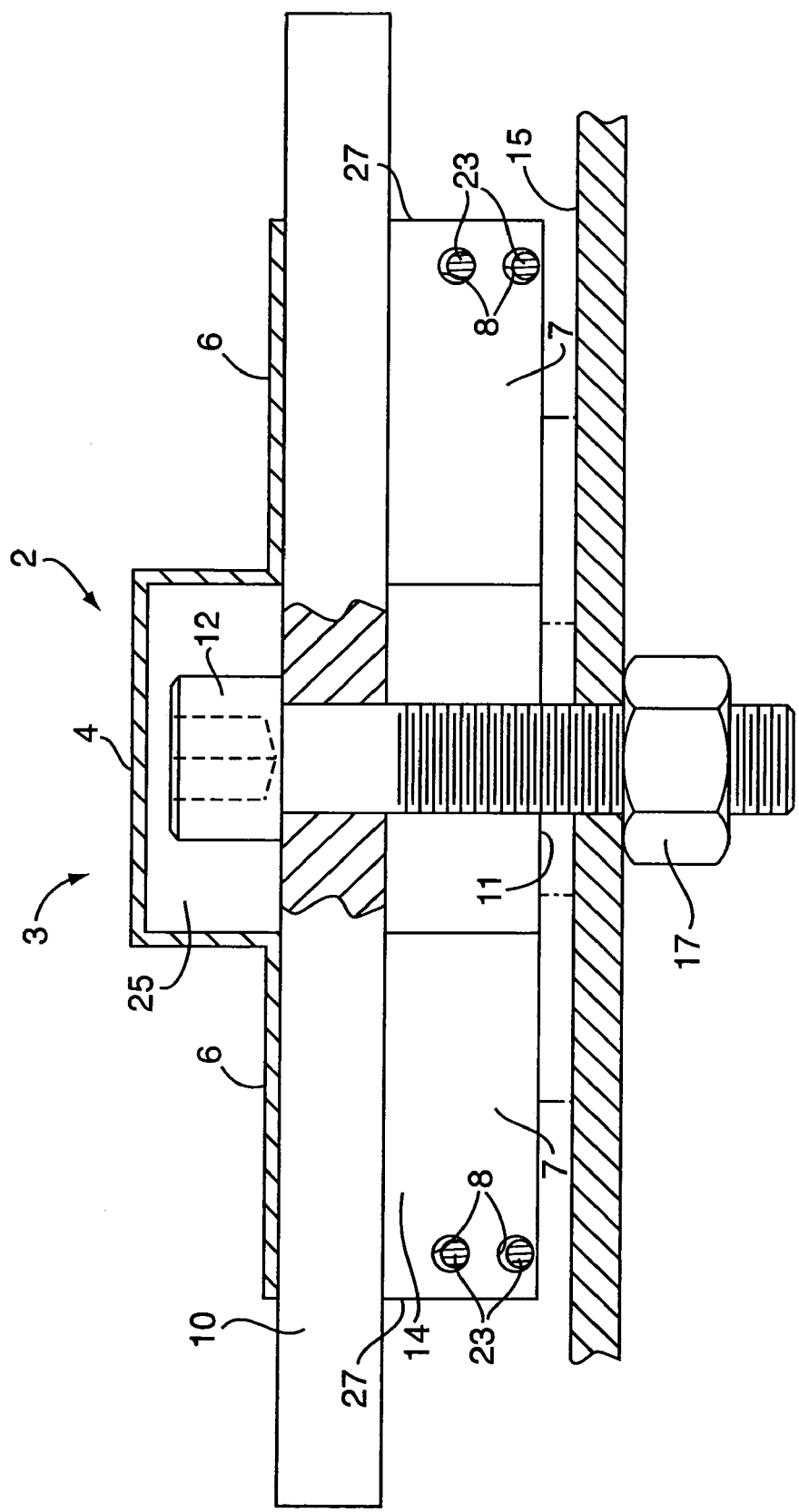
FIG. 2 is a partially sectional side view of the locking mechanism of FIG. 1.

Referring to FIGS. 1–5, the present invention locking mechanism, generally referred to by the reference numeral 2, includes a housing 3 having a center portion 4 and at least one flange portion 6 extending outwardly from the center portion. As shown, the mechanism 2 includes two flange portions 6 with the center portion 4 located between the flange portions 6. The flange portions 6 being opposite one another and coplanar.

The center portion 4 and flange portions 6 cooperate to define an opening 14 extending through the center portion 4 and each of the flange portions 6 for receiving a tie down bar 10 and tie down screw 12. The tie down bar 10 is of the type typically used to secure a snowmobile (not shown) to the deck 15 of a trailer.

The flange portions 6 further define lock openings 8 through which a padlock 13 or similar lock may be placed to secure the locking mechanism to the tie down bar 10. As shown in FIG. 1, the lock openings 8 are disposed in a lower portion of the flanges 6 such that when the housing 3 is positioned over the tie down screw 12 and tie down bar 10, the lock openings are below the tie down bar 10. Thus, a shackle portion 23 of the lock 13 disposed in the lock openings 8 is below the tie down bar 10 thereby preventing the housing from being removed from the tie down bar.

The center portion 4 defines a hollow interior cavity 25 which extends from the opening 14 and covers and protects the tie down screw 12. As will be appreciated, the center portion 4 is sized to accommodate a snowmobile tie down screw 12 and tie down bar 10. As mentioned above, the screw 12 is used to tighten the tie down bar 10 down against the skis of a snowmobile to prevent it from moving while being transported on a trailer. Typically, the tie down screw 12 is threadably received in a mating fixture or nut 17 that is attached to or below the trailer deck 15. Alternatively, a standard nut could be coupled to the tied down screw 12 below the deck 15 to secure the tie down bar 10 to the deck of the trailer with the skis of the snowmobile therebetween. The center portion 4 covers the screw 12 and bar 10 and prevents the screw from being cut with a saw or otherwise breached. Preferably, the housing 3 is configured so that when the housing is installed over the tie down bar 10 and tie down screw 12, the lower surface 11 of the housing rests on or is positioned very close to the trailer deck 15 thereby preventing access to the tie down screw 12.

Figure 3:
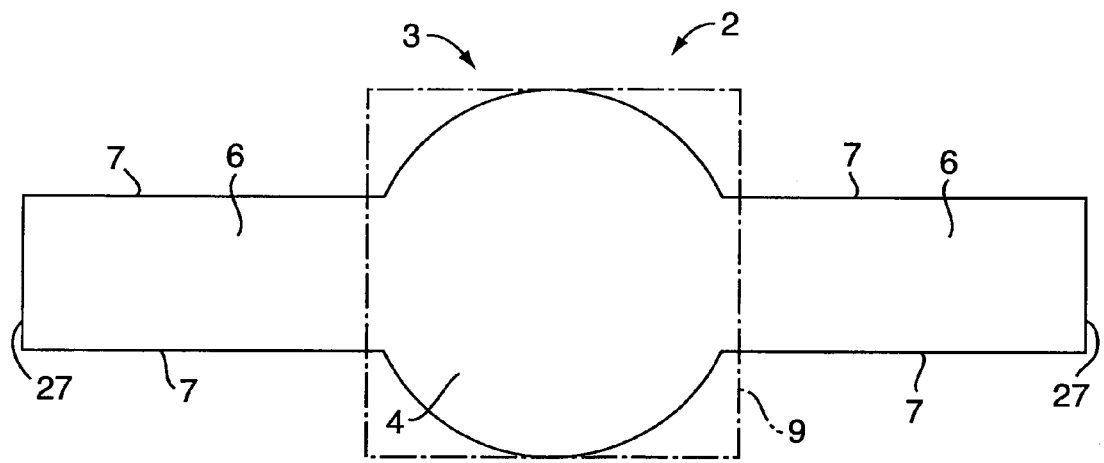
FIG. 3 is a top view of another embodiment of a locking mechanism in accordance with the present invention.

The locking mechanism 2 is preferably manufactured from metal or a material of similar strength to deter tampering with the locking mechanism and to provide durability. As will be apparent to one skilled in the art, the center portion 4 may be substantially square, rectangular or round in shape. FIG. 3 depicts the center portion of the housing 3 having a round shape identified with the reference numeral 4 and a square cross section which is shown in broken lines and identified with the reference numeral 9.

Figure 4:
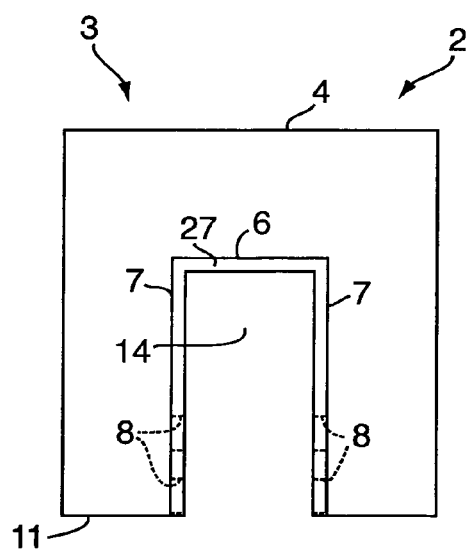
FIG. 4 is a end view of the locking mechanism of FIG. 1.

Referring to FIGS. 3 and 4, the flange portions are substantially U-shaped and have open ends 27 which in part define the opening 14. The flange portions 6 also include opposing side walls 7. The shape of the flange portions 6 is an important aspect of the present invention in that the flange portions 6 fit over and are secured to the tie down bar 10. The flange portions 6 are sized and shaped such that the tie down bar 10 fits into the opening 14 defined by the flange portions 6 and the center portion 4 and protrudes from the opposing ends 27 of the flange portions (FIG. 1).

Still referring to FIG. 1, the flange portions 6 feature openings or bores 8 that are an important aspect of the present invention. The openings 8 are defined by the side walls 7 of the flange portions 6. When the locking mechanism 2 is placed over the tie down bar 10, the openings 8 are located below the bar 10 so that the shackle 23 of a padlock 13 or other type of lock may be placed through the openings 8 thereby preventing removal of the locking mechanism 2 from the bar 10. Further, the tie down screw 12 is not accessible when the housing 3 is secured to the tie down bar 10 as set forth above. Thus, the housing prevents unauthorized access to the tie down screw 12.

FIG. 1 shows the padlock 13 secured through two of the openings 8 in each of the opposing side walls 7, however this is not necessary as the lock 13 needs to be secured through only 1 of the openings or one pair of openings to secure the housing 3 to the tie down bar 10. Multiple openings 8 are provided in the side walls 7 so that the housing can be utilized with snowmobiles having skis of different heights wherein regardless of the height of the skis relative to the trailer deck 15, at least one of the openings 8 or one pair of openings will be below the tie down bar 10 so that a lock or locks can be secured in the openings 8 below the tie down bar.

In other embodiments, the lock openings 8 could be located in the central portion 4 of the lock mechanism 2 or otherwise configured to accommodate a lock or other device to prevent the lock mechanism 2 from being removed from the tie down bar 10 and thereby providing access to the tie down screw 12.

Figure 5:
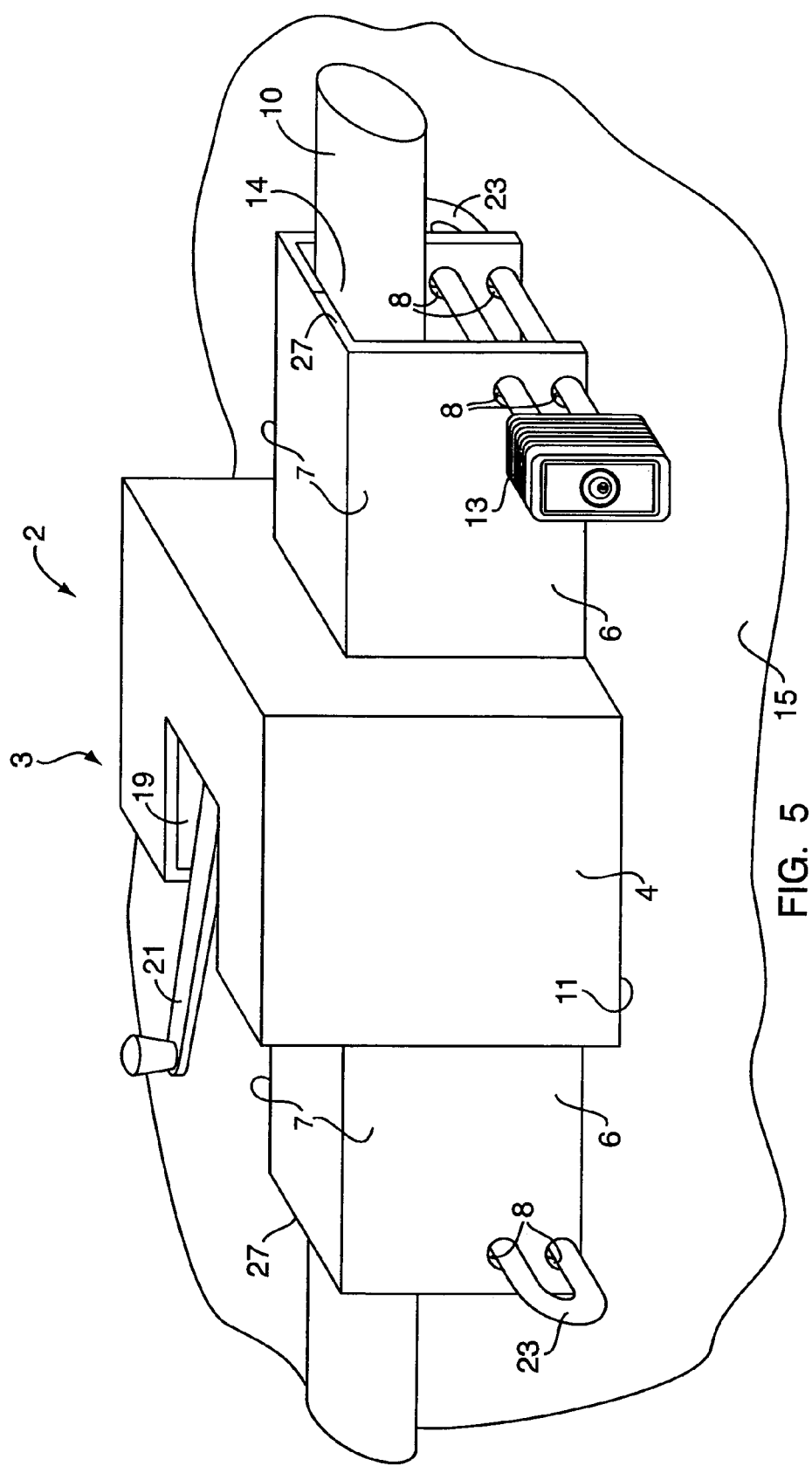
FIG. 5 is a perspective view of another embodiment of a locking mechanism of the present invention designed for use with a tie down screw having a crank portion.

FIG. 5 illustrates another embodiment of the present invention locking mechanism identified generally with the reference numeral 5 wherein the center portion 4 defines an opening 19 for receiving the crank portion 21 of a typical hold down screw assembly.

In some tie down systems currently available, the tie down screw includes a crank portion 21 which is attached to a tie down screw and used to secure the tie down screw to the trailer deck 15. Thus, the locking mechanism 5 is provided with the opening 19 for receiving the crank portion 21 of the tie down screw after the screw is secured to the trailer. The locking mechanism 5 is secured to the tie down bar using the locks 13 as described above.

Although the present invention has been described with reference to preferred embodiments, it will be appreciated by those or ordinary skill in the art, that various modifications to this invention may be made without departing form the spirit and scope of the invention.

What is claimed is:

1. A locking mechanism for use with a snowmobile trailer having an associated tie down bar wherein the tie down bar is removably attachable to the trailer via a tie down screw for securing a snowmobile to the trailer, the locking mechanism comprising:
   a housing defining an opening in a bottom side thereof for receiving a portion of a tie down bar and a tie down screw, the housing being positionable over the tie down screw and the tie down bar for preventing access to the tie down screw;
   the housing further defining a lock opening for receiving a portion of a lock, the lock opening disposed in a lower portion of the housing such that a lock disposed in the lock opening is below the tie down bar when the housing is positioned over the tie down bar, thereby securing the housing to the tie down bar.

2. The locking mechanism according to claim 1 wherein the housing further comprises a center portion and at least one flange portion extending outwardly therefrom, the center portion for receiving at least a portion of the tie down screw, the flange portion being configured to extend over a portion of the tie down bar thereby further preventing access to the tie down screw.

3. The locking mechanism according to claim 2 wherein the flange portion defines the lock opening.

4. The locking mechanism according to claim 1 wherein the lock opening further comprises two openings, each of the two openings being configured to receive a leg of a shackle of the lock.

5. The locking mechanism according to claim 1 wherein the housing further defines a crank opening in an upper portion thereof for receiving a portion of a crank of a tie down screw assembly.

6. The locking mechanism according to claim 1 wherein the housing is steel.

7. The locking mechanism according to claim 2 wherein the housing further comprises two flange portions, each flange portion extending outwardly from the center portion and configured to receive a portion of the tie down bar, thereby further preventing access to the tie down screw.

8. A locking mechanism for use with a snowmobile trailer and tie down bar wherein the tie down bar is removably attachable to the trailer via a tie down screw for securing a snowmobile to the trailer, the locking mechanism comprising:
   a housing having a center portion and two outwardly extending flange portions, the flange portions extending from opposing sides of the center portion and cooperating with the center portion to define an opening in a bottom side of the housing for receiving a portion of a tie down bar and a tie down screw, the housing being positionable over the tie down bar and tie down screw for preventing access to the tie down screw;
   the flange portions each defining at least one lock opening for receiving a portion of a lock, the lock opening disposed in a lower portion of the housing such that a lock disposed in the lock opening is below the tie down bar when the housing is positioned over the tie down bar, thereby securing the housing to the tie down bar.

9. The locking mechanism according to claim 8 wherein the center portion defines a crank opening for receiving a portion of a crank member of the tie down screw.

10. The locking mechanism according to claim 8 wherein the housing is steel.

11. The locking mechanism according to claim 8 wherein the lock openings are configured such that the lock is positionable under the snowmobile disposed on the trailer such that the lock is not readily accessible.

12. The locking mechanism according to claim 8 wherein the flange portions include opposing side walls each defining the at least one lock opening, wherein the lock can be positioned through the openings in each of the opposing side walls thereby preventing the housing from being removed from the tie down bar.

13. The locking mechanism according to claim 8 wherein the housing further comprises a lower surface engageable with a deck of the trailer when the locking mechanism is installed on the trailer, the housing thereby preventing access to the tie down screw.

\* \* \* \* \*